United States Patent
Gutshall

[15] 3,678,980
[45] July 25, 1972

[54] PANEL INSERT DEVICE
[72] Inventor: Charles E. Gutshall, Roselle, Ill.
[73] Assignee: Illinois Tool Works Inc., Chicago, Ill.
[22] Filed: March 26, 1970
[21] Appl. No.: 22,811

[52] U.S. Cl. .............................151/41.7, 85/32 R, 151/41.73
[51] Int. Cl. .........................................................F16b 37/04
[58] Field of Search .......................151/41.7, 41.73, 38; 85/9; 52/617

[56] References Cited

UNITED STATES PATENTS

| | | | |
|---|---|---|---|
| 3,179,143 | 4/1965 | Schultz et al. | 151/41.7 |
| 2,718,485 | 9/1955 | Samuely | 151/41.7 |
| 2,632,355 | 3/1953 | Becker | 151/38 |
| 2,734,547 | 2/1956 | Holchkin | 151/38 |
| 1,062,635 | 5/1913 | Clements | 85/9 R |
| 2,880,830 | 4/1959 | Rohe | 151/21 B |
| 2,385,296 | 9/1945 | Moore | 151/41.7 |

FOREIGN PATENTS OR APPLICATIONS

646,210  11/1950  Great Britain ........................151/41.73

Primary Examiner—Edward C. Allen
Attorney—Olson, Trexler, Wolters & Bushnell, Robert W. Beart, Michael Kovac, Barry L. Clark and Jack R. Halvorsen

[57] ABSTRACT

The present invention relates generally to insert devices for panels and more particularly to insert devices for installation in light weight panels such as panels composed of a honeycomb core bounded by skin sheets. The embodiments of the present invention disclosed in the drawings include a sheet metal fastener member having an annular body which is partially severed transversely. A portion of the body adjacent one side of the body severance is deflected axially to provide an entering helical lead and panel rupturing edge. The annular body has an internally threaded extrusion, and a thermoplastic adhesive is attached to the body which, when heated, will form a band between the fastener body and a complementary honeycomb core.

9 Claims, 12 Drawing Figures

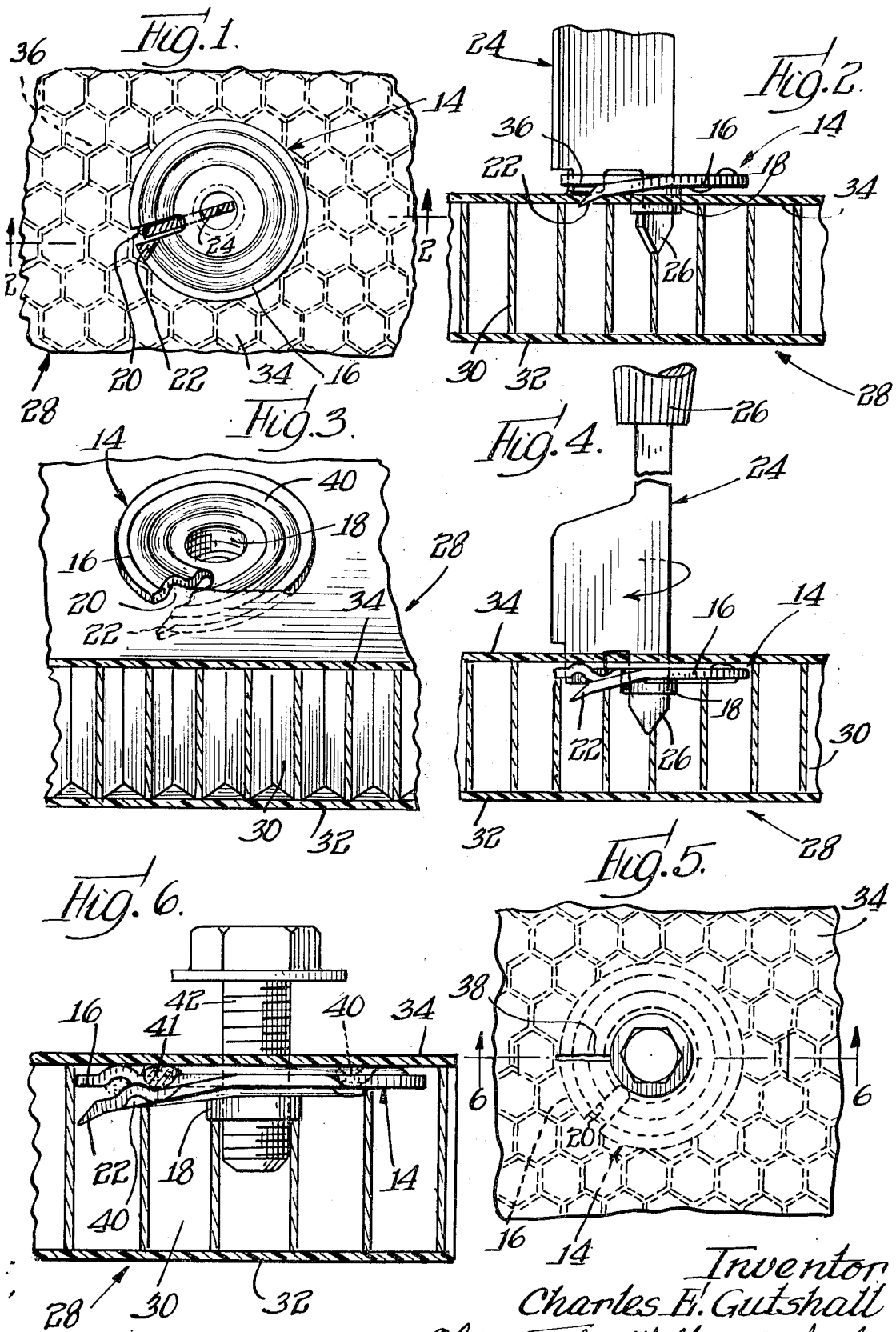

Patented July 25, 1972
3,678,980
2 Sheets-Sheet 2
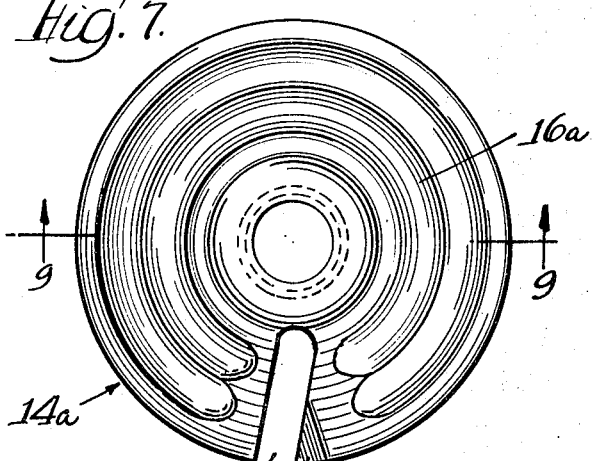
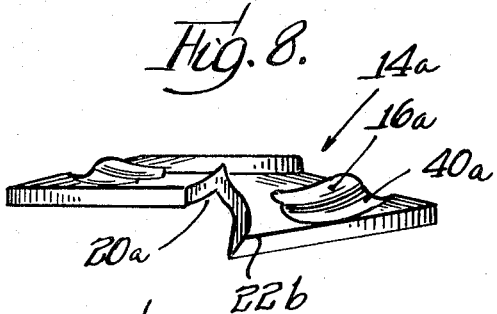
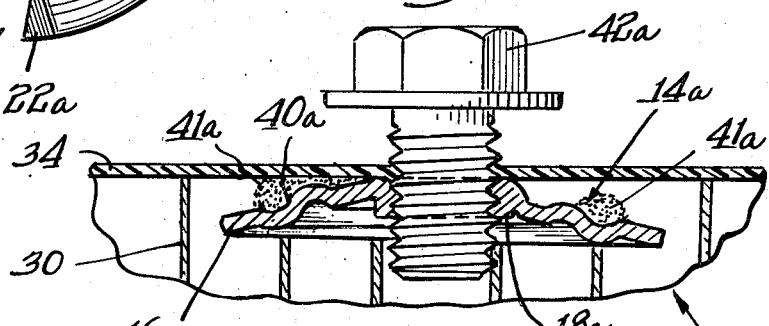
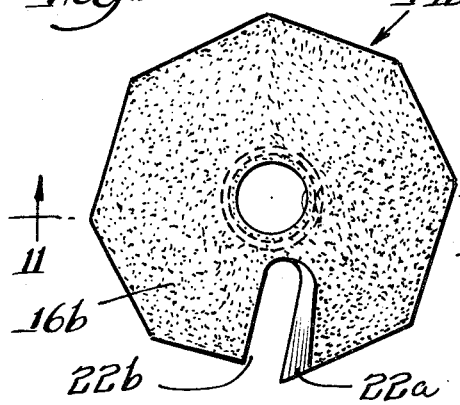
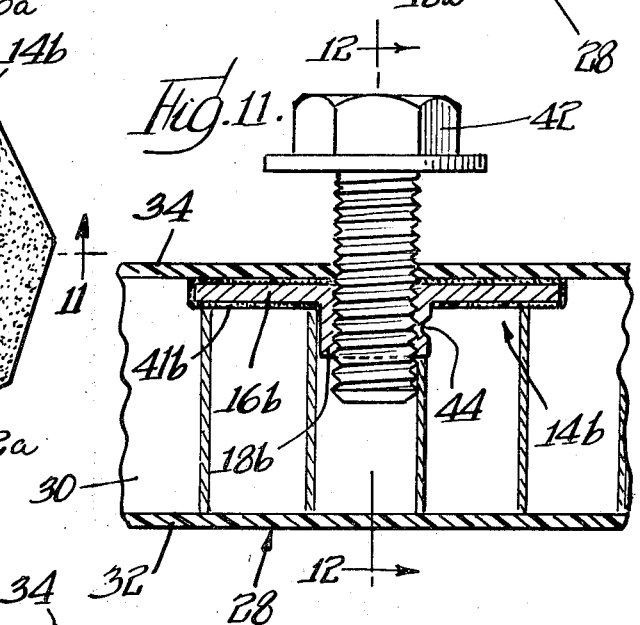
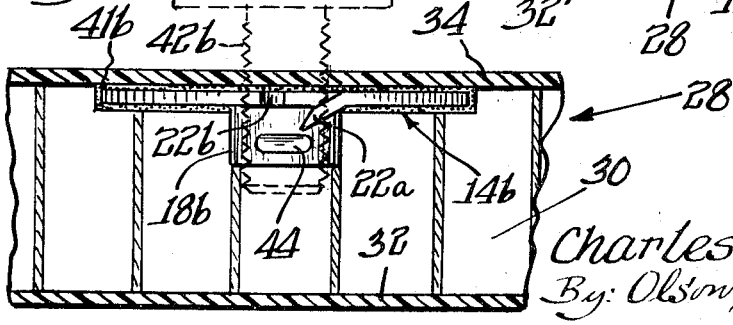
Inventor
Charles E. Gutshall
By: Olson, Trexler, Wolters & Bushnell attys.

PANEL INSERT DEVICE

SUMMARY OF THE INVENTION

Light weight honeycomb type panels of the type referred to above, because of their porous nature, will not support a screw member driven directly into the panel. Hence it becomes necessary, in order to secure various objects to such panels, to imbed a screw accommodating member or insert within the panel. The present invention contemplates the provision of a very simple, inexpensive and highly efficient insert device which is particularly adapted for use in honeycomb type panels.

It is an important object of the present invention to provide a screw accommodating insert device which may be installed with ease, and which upon being imbedded within a panel by the application of rotative forces will become bonded to the material of the honeycomb when the insert is subjected to heat.

More specifically, the invention contemplates a new and improved screw fastener accommodating insert device which, upon rotation, will imbed itself within the panel core, and due to the nature of the insert exterior, it will become chemically bonded or fused to the honeycomb core upon the application of heat thereto.

BRIEF DESCRIPTION OF THE DRAWINGS

The foregoing, and other objects and advantages will be more apparent from the following detailed description when considered in connection with the accompanying drawings, wherein:

FIG. 1 is a plan view of an insert device of the present invention in its initial position of association with the outer surface of a panel;

FIG. 2 is a side elevational view of the insert device shown in FIG. 1, having in association therewith a tool member which is employed to rotate the insert after the adjacent skin sheet of the panel has been broken, the panel structure being shown in section taken substantially along the line 2—2 of FIG. 1;

FIG. 3 is a perspective view similar to FIG. 1, disclosing the insert device of the present invention after it has been partially rotated into association with the panel;

FIG. 4 is a view similar to FIG. 2, disclosing the insert device after it has been completely driven into association with the panel core;

FIG. 5 is a plan view of the structure shown in FIG. 4, with the insert rotating tool removed therefrom;

FIG. 6 is a sectional view similar to FIG. 4, disclosing a fastener screw member in association with the insert;

FIG. 7 is a plan view of a modified embodiment of the present invention;

FIG. 8 is a front elevational view of the insert device shown in FIG.

FIG. 9 discloses the insert device of FIGS. 7 and 8 imbedded within the core of a panel with a fastening screw applied to the internal threads of the fastener device, said view being taken substantially along the lines 9—9 of FIG. 7;

FIG. 10 is a plan view of a still further modified embodiment of the present invention;

FIG. 11 is a sectional view showing the insert device of FIG. 10 imbedded within a panel core, said view being taken substantially along the lines 11—11 of FIG. 10; and FIG. 12 is a sectional view similar to FIG. 11, taken substantially along the line 12—12 of FIG. 11, the screw element being illustrated by dot-and-dash lines.

DESCRIPTION OF THE PREFERRED EMBODIMENTS

Referring now to the drawings more in detail, wherein like numerals have been employed to designate similar parts throughout the various figures, it will be seen that an insert device, designated generally by the numeral 14, is illustrated in FIGS. 1-6, inclusive. The device 14 comprises a sheet metal annular body 16 formed with a central internally threaded extrusion 18 of limited axial extent. The body 16 is partially severed radially by a slot 20. A portion of the body 16, the trailing side of the severance or slot 20, is axially deflected to provide an entering helical lead and panel rupturing edge 22.

FIGS. 2 and 4 disclose a tool member 24 which is employed to impart rotation to the insert member 14. It will be noted that the tool 24 has a pointed depending extremity 26 which may be telescopically associated with the central aperture of the annular body 16 after the device 14 has been placed in the required position upon the surface of the panel designated generally by the numeral 28. The panel 28 includes a honeycomb core 30 bounded by skin sheets 32 and 34. The entering end 26 of the tool is also used to rough out an opening in the panel 28 for accommodating the central extrusion 18.

Before employing the tool 24 for rotating the insert 14, a skin piercing section or blade 36 of the tool is shifted axially through the slot 20 of the body 16 sufficiently to penetrate and rupture the skin 34. This penetration causes a radial opening or slot 38 to be formed, as clearly shown in FIG. 5. The tool 24 is now retracted slightly so that the skin rupturing or penetrating section 36 thereof clears the outer surface of the skin sheet 34. Rotation may then be imparted in a clockwise direction as viewed in FIG. 1. This causes the advancing side of the tool section 36 to engage the edge of the annular body 16 defining the slot or severance 20. The panel entering edge 22 of said body enters the previously formed radial opening or slot 38. Continued rotation of the tool 24 causes the entering edge 22 to serve as a helical lead for the remainder of the annular body 16. When the tool 24 has completed one complete revolution, the body 16 will have been completely imbedded within the honeycomb core 30 and will occupy the position shown in FIGS. 4, 5 and 6.

Attention is directed to the provision in the body 16 of the device 14 of a plurality of concentric annular indentations 40. These indentations 40 serve to retain a quantity of thermoplastic adhesive material 41 which, when subjected to heat, will establish a chemical bond between the insert 14 and the material of the honeycomb core 30. Thus after the insert 14 has been completely imbedded within the core as shown in FIGS. 4–6, inclusive, it may be subjected to heat, as for example by induction. As a result, the thermoplastic material 41 becomes viscous and a firm bond is established. Upon cooling, the insert is firmly secured against rotation and unauthorized axial dislodgement with respect to the panel core. A suitable screw member such as the screw member 42 shown in FIG. 6 may now be applied to the internally threaded extrusion 18 for the purpose of securing an object to the panel.

In FIGS. 7, 8 and 9, a slightly modified embodiment of the invention is disclosed in the form of an insert designated generally by the numeral 14a. The insert 14a differs structurally from the previously described insert 14 in the provision of an annular body 16a of substantially conical cross-section. In all other respects the insert 14a corresponds structurally with the previously described insert 14 and portions of the insert 14a corresponding with the previously described insert 14 are given corresponding numbers with the suffix a.

FIGS. 10–12, inclusive, disclose a slightly modified form of insert designated generally by the numeral 14b. It will be noted that the peripheral shape of the annular body 16b is octagonal as distinguished from the circular periphery of the previously described insert. Also, the extrusion 18b of the insert 14b is provided with an indented portion 44 to provide a prevailing torque when the screw member 42b is applied thereto. The thermoplastic adhesive 41 is in the form of film covering the outer surface of the relatively flat annular body 16b.

The tool 24 is provided with a handle 46 whereby to facilitate manual manipulation thereof. In some instances, it has been found advantageous to provide a series of small apertures in the annular body to increase the bonding effect of the thermoplastic adhesive.

I claim:

1. An insert device for installation in light weight panels such as panels composed of a honeycomb core bounded by skin sheets, including a sheet metal fastener member having an annular body which is partially severed transversely, the portion of the body adjacent one side of said body severance being deflected axially and providing an entering helical lead and panel rupturing edge, a centrally disposed internally threaded extrusion extending from said body in the axial direction of the body deflection, and thermoplastic adhesive material carried in imperforate pocket means provided by deformations in the annular body and extending out of the plane thereof and disposed therearound outwardly from the threaded extrusion and which adhesive, when heated, will rebond severed core material while forming a bond between the fastener body and the honeycomb type of panel with which it may be associated.

2. An insert device for installation in light weight panels as set forth in claim 1, wherein the thermoplastic adhesive material is carried on both sides of the annular body.

3. An insert device for installation in light weight panels as set forth in claim 1, wherein the internally threaded extrusion is of restricted axial extent.

4. An insert device for installation in light weight panels as set forth in claim 1, wherein the pocket means in the body are annularly disposed depressions for accommodating the thermoplastic adhesive.

5. An insert device for installation in light weight panels as set forth in claim 4, wherein the annularly disposed depressions are in the form of concentric rings formed in the body.

6. An insert device for installation in light weight panels as set forth in claim 1, wherein the shape of the outer periphery of the annular insert body is non-circular.

7. An insert device for installation in light weight panels as set forth in claim 1, wherein the annular body has a multi-sided outer periphery.

8. An insert device for installation in light weight panels as set forth in claim 1, wherein the annular body of the insert is substantially conical in axial section.

9. An insert device for installation in light weight panels as set forth in claim 1, wherein the internally threaded extrusion is provided with a peripheral deformation for exerting a prevailing torque when a screw member is applied thereto.

* * * * *